United States Patent
Leethaus et al.

(10) Patent No.: US 12,054,602 B2
(45) Date of Patent: Aug. 6, 2024

(54) ARTICLE, IN PARTICULAR AIR SPRING BELLOWS, A METAL-RUBBER ELEMENT, OR A VIBRATION DAMPER

(71) Applicant: ContiTech Luftfedersysteme GmbH, Hannover (DE)

(72) Inventors: Thorsten Leethaus, Eschershausen (DE); Dieter Borvitz, Hannover (DE); Klaus Schobert, Rodenberg (DE); Barbara Passon-Wesseloh, Goettingen (DE); Jens Storre, Noerten-Hardenberg (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 311 days.

(21) Appl. No.: 17/443,459

(22) Filed: Jul. 27, 2021

(65) Prior Publication Data

US 2021/0355305 A1  Nov. 18, 2021

Related U.S. Application Data

(63) Continuation of application No. 16/956,411, filed as application No. PCT/EP2018/085126 on Dec. 17, 2018, now abandoned.

(30) Foreign Application Priority Data

Dec. 21, 2017 (DE) ..................... 10 2017 223 545.4

(51) Int. Cl.
| | |
|---|---|
| *C08L 11/00* | (2006.01) |
| *C08K 3/04* | (2006.01) |
| *C08K 3/22* | (2006.01) |
| *C08L 7/00* | (2006.01) |
| *C09D 107/00* | (2006.01) |
| *C09D 111/00* | (2006.01) |
| *C09J 107/00* | (2006.01) |
| *C09J 111/00* | (2006.01) |
| *F16F 1/36* | (2006.01) |
| *F16F 3/10* | (2006.01) |
| *F16F 9/04* | (2006.01) |
| *F16G 1/06* | (2006.01) |

(52) U.S. Cl.
CPC ................. *C08L 11/00* (2013.01); *C08L 7/00* (2013.01); *C09D 107/00* (2013.01); *C09D 111/00* (2013.01); *C09J 107/00* (2013.01); *C09J 111/00* (2013.01); *C08K 3/04* (2013.01); *C08K 3/22* (2013.01); *C08K 2003/2227* (2013.01); *C08K 2201/005* (2013.01); *C08K 2201/006* (2013.01); *C08K 2201/014* (2013.01); *C08K 2201/019* (2013.01); *C08L 2201/02* (2013.01); *F16F 1/3605* (2013.01); *F16F 3/10* (2013.01); *F16F 9/0409* (2013.01); *F16F 9/0418* (2013.01); *F16F 2224/025* (2013.01); *F16F 2234/02* (2013.01); *F16G 1/06* (2013.01)

(58) Field of Classification Search
CPC .... C08L 3/22; C08L 3/04; C08L 11/00; C08L 7/00; C08K 3/2227; C08K 2201/005; C08K 2003/2227; B29D 22/00; B29D 22/02; B29D 22/023
See application file for complete search history.

(56) References Cited

U.S. PATENT DOCUMENTS

| | | |
|---|---|---|
| 6,186,204 B1 | 2/2001 | Sasaka et al. |
| 6,242,522 B1 | 6/2001 | Ezawa et al. |
| 8,052,918 B2 | 11/2011 | Magario et al. |
| 10,344,818 B2 | 7/2019 | Leethaus et al. |
| 2001/0023271 A1 | 9/2001 | Kikuchi et al. |
| 2003/0149161 A1 | 8/2003 | Ezawa et al. |
| 2003/0166759 A1 | 9/2003 | Kikuchi |
| 2007/0176155 A1 | 8/2007 | Granada, Jr. et al. |
| 2010/0174023 A1 | 7/2010 | Ondo |
| 2011/0105669 A1* | 5/2011 | Ignatz-Hoover ......... C08K 5/54 524/588 |
| 2012/0135221 A1 | 5/2012 | Weidinger et al. |

(Continued)

FOREIGN PATENT DOCUMENTS

| | | | |
|---|---|---|---|
| CN | 102731837 A | 10/2012 | |
| CN | 105968591 A * | 9/2016 | ............... B29B 7/28 |

(Continued)

OTHER PUBLICATIONS

Machine translation of CN 107841056 (2018, 4 pages).*
Machine translation of CN 105968591 (2016, 7 pages).*
"Nabaltec—Apyral—Technisches Datenblatt / Aluminiumhydroxid /Aluminium Hydroxide (Anlage MJ4) Apyral 120 E (Mineralisches Flammschutzmittel)—Nabaltec AG".
Nabaltec AG (Nabaltec.de—Internetauszug—1 Seite) (Anlage MJ5) / Richtwerte Apyral / Dec. 2, 2016.
"World Health Organization (WHO) / IARC Monographs on the Evaluation of Carcinogenic Risks to Humans vol. 93 Carbon Black, Titanium Dioxide, and Talc (Anlage MJ6)".

(Continued)

*Primary Examiner* — Brieann R Johnston

(57) ABSTRACT

The invention relates to an article having a single- or multi-layered main body having elastic properties, in particular an air spring bellows, a metal-rubber element or a vibration damper.
In order to improve its flame retardant properties, the main body of the article consists of or contains at least one layer D constructed from a rubber mixture which is free from halogen-containing flame retardants and contains at least one carbon black having a BET surface area according to DIN-ISO 9277 between 35 and 140 m²/g and an oil absorption number (OAN) according to ISO 4656 between 70 and 140 ml/100 g and a first aluminum trihydrate (ATH_1) and at least a further aluminum trihydrate (ATH_2), wherein the first aluminum trihydrate (ATH_1) and the further aluminum trihydrate (ATH_2) each have a different particle size.

18 Claims, No Drawings

(56) References Cited

U.S. PATENT DOCUMENTS

| | | | |
|---|---|---|---|
| 2012/0259051 A1* | 10/2012 | Miyazaki | C08K 5/13 524/418 |
| 2014/0011012 A1 | 1/2014 | Noda et al. | |
| 2015/0011676 A1 | 1/2015 | Miyazaki | |
| 2015/0203693 A1 | 7/2015 | Mestan | |
| 2016/0053076 A1 | 2/2016 | Oka et al. | |
| 2017/0267260 A1 | 9/2017 | Fromont et al. | |
| 2017/0307042 A1 | 10/2017 | Zander et al. | |
| 2018/0202584 A1 | 7/2018 | Sato | |
| 2019/0249741 A1* | 8/2019 | Howard | C08K 3/346 |
| 2020/0032030 A1 | 1/2020 | Mestan | |

FOREIGN PATENT DOCUMENTS

| | | | |
|---|---|---|---|
| CN | 107841056 A * | 3/2018 | |
| EP | 2944669 A1 | 11/2015 | |
| EP | 3404060 A1 | 11/2018 | |
| JP | 2007023102 A | 2/2007 | |
| JP | 2008255276 A | 10/2008 | |
| JP | 2017072231 A | 4/2017 | |
| KR | 101827343 B1 | 2/2018 | |
| WO | 2014019008 A1 | 2/2014 | |
| WO | 2016045813 A1 | 3/2016 | |
| WO | 2016149729 A1 | 9/2016 | |
| WO | 2017045785 A1 | 3/2017 | |

OTHER PUBLICATIONS

"Bayer AG—Bayer Handbuch für die Gummiindustrie / Baypren—Chloropren-Kautschuk (CR) (A 2.4) (Vorwort u. Text.—Anlage MJ3) / Jun. 1, 1991".

EP Third-Party Observations dated Oct. 4, 2021 of EP application 18830768.0 correspondent foreign application of this application.

Kisuma Chemicals Datasheet / Kisuma 5A—Magnesium Hydroxide as Flame Retardant.

Hewitt / Mineral Filler Fire Retardants, Fillers for Polymer Applications, Polymers and Polymeric Composites.

Kisuma Chemicals Datasheet / Kisuma 5B—Magnesium Hydroxide as Flame Retardant.

Cho / Conversion of Natural Gas to Hydrogen and Carbon Black by Plasma and Application of Plasma Black.

Philips Carbon Black Limited / Orient Black N330T.

International Search Report of International Application PCT/EP2018/085126.

* cited by examiner

ARTICLE, IN PARTICULAR AIR SPRING BELLOWS, A METAL-RUBBER ELEMENT, OR A VIBRATION DAMPER

CROSS REFERENCE TO RELATED APPLICATIONS

This Patent Application is a Continuation Application of, and claims priority to, U.S. Nonprovisional patent application Ser. No. 16/956,411 filed Jun. 19, 2020 as a continuation application of international patent application PCT/EP2018/085126, filed Dec. 17, 2018, which is incorporated herein in its entirety, by reference. This Patent Application also claims priority to German Patent Application No. 10 2017 223 545.4, filed Dec. 21, 2017, which is incorporated herein in its entirety, by reference.

DESCRIPTION

The invention relates to an article having a single- or multi-layered main body having elastic properties, in particular an air spring bellows, a metal-rubber element or a vibration damper.

Articles having elastic properties that are used for the suspension of, for example, motor vehicles or track vehicles and/or vibration damping are made using elastomeric mixtures, also known as rubber mixtures. These elastomeric mixtures typically used for the fundamental properties of such articles are well known. Articles having outstanding elastic properties, for example metal-rubber elements or vibration dampers, preferentially contain vulcanized mixtures of rubber which are predominantly based on natural rubber (NR) and/or polyisoprene rubber (IR). Articles having very good resistance to weathering, mineral oil and heat, examples being air spring bellows, preferentially contain vulcanized mixtures of rubber which are predominantly based on chloroprene rubber (CR).

However, articles comprising these elastomeric mixtures display distinct disadvantages in fire behavior. The evolution of thick smoke is one of the consequences of a fire. The heat release rate is particularly high in the combustion process of the aforementioned elastomeric mixtures which are predominantly based on NR and/or IR. The evolving smoke from the combustion process of elastomeric mixtures based predominantly on CR is toxic to humans and animals.

The recent increase in fire safety requirements as reflected above all in the stricter fire safety standard EN45545 is driving an increased need for polymer articles optimized for fire safety. These fire safety requirements are no longer met both by the aforementioned elastomeric mixtures that are predominantly based on NR and/or IR, above all because of the required maximum heat release rate, but also by the flame-resistant elastomeric mixtures that are predominantly based on CR, particularly because of the required smoke toxicity. Articles containing these elastomeric mixtures thus usually no longer meet the stricter requirements.

A customary method of improving fire behavior of rubber mixtures is direct incorporation of sometimes comparatively large amounts of flame retardant substances. However in the mixtures concerned this measure generally results in impairment in physical properties, especially hardness for example, which is relevant for use in dynamic applications. This is reflected in the articles concerned especially in impaired cushioning, settling or vibration properties.

The present invention accordingly has for its object to provide an article having optimized fire safety behavior in order to meet stricter requirements, especially those described in EN-45545. In particular, at least Hazard Level 2, as described in the standard, shall be achieved. At the same time, the necessary physical properties of the article, especially hardness for example, shall remain at a comparable level.

This object is achieved when the article has a single-layered or multi-layered main body having elastic characteristics, wherein at least a layer D of the main body is constructed from a rubber mixture which is free from halogen-containing flame retardants and contains at least one carbon black having a BET surface area according to DIN-ISO 9277 between 35 and 140 $m^2/g$ and an oil absorption number (OAN) according to ISO 4656 between 70 and 140 ml/100 g and a first aluminum trihydrate (ATH_1) and at least one further aluminum trihydrate (ATH_2), wherein the first aluminum trihydrate (ATH_1) and the further aluminum trihydrate (ATH_2) each have a different particle size.

It has now been found that, surprisingly, the combination of such finely divided carbon blacks with the different ATH types has a positive influence on fire behavior. It is consequently possible to significantly reduce the amount of further additional flame retardants so that the hardness required for the dynamic properties of the article is not adversely impaired.

This makes it possible to continue to utilize the advantages of natural rubber and/or chloroprene rubber in dynamically highly stressed articles without sacrificing physical properties, especially in terms of hardness.

According to the invention at least one carbon black having a BET surface area according to DIN-ISO 9277 between 35 and 140 $m^2/g$ and an oil absorption number (OAN) according to ISO 4656 between 70 and 140 ml/100 g is employed. This means it is preferable to employ carbon blacks designated N-1xy, N-2xy, N-3xy, N-4xy or N-5xy, wherein x and y may each independently of one another be an integer between 0 and 9. The carbon blacks are designated according to the classification table of ASTM D 1765-06. Particularly good properties are achieved by N550 and N339 carbon blacks. The recited carbon blacks having the designations N-1xy, N-2xy, N-3xy, N-4xy or N-5xy may be employed alone or in combination. In a particularly preferred embodiment N339 and N550 carbon blacks are each employed alone or in combination. These two types are particularly suitable in terms of fire safety behavior, especially N339, abrasion resistance, especially N550, and dynamic properties.

The total amount of the employed carbon black is preferably 5 to 30 phr. If more than one carbon black having the properties according to claim 1 is employed then the amount of 5 to 30 phr relates to the total amount of carbon blacks having the properties according to claim 1.

In a preferred embodiment the first aluminum trihydrate (ATH_1) has a particle size $d_{50}$ determined by laser diffraction between 0.1 and 0.6 µm, while the further aluminum trihydrate (ATH_2) has a particle size $d_{50}$ determined by laser diffraction between 0.9 and 1.5 µm.

In a particular embodiment, the first aluminum trihydrate (ATH_1) is employed in preferred amounts of 30 to 70 phr and in particularly preferred amounts of 35 to 60 phr, while the further aluminum trihydrate (ATH_2) is employed in preferred amounts of 60 to 150 phr and in particularly preferred amounts of 80 to 120 phr.

The use of at least two ATH having different particle sizes results in an optimization of the packing density in the filler network, which in turn contributes to improved fire safety behavior.

In a preferred embodiment ATH_1 and/or ATH_2 may each be silanized. Silanization further optimizes fire safety behavior through improved bonding of the ATHs to a filler network.

In a preferred embodiment the rubber mixture of the layer D also contains at least one further flame retardant.

Contemplated here are in particular stannates, such as zinc stannate or zinc hydroxystannate, further hydroxides, such as magnesium hydroxide or calcium hydroxide, cyanurates, such as melamine cyanurate, borates, such as zinc borate or calcium borate, phosphorus-containing components, such as resorcinol diphosphate, melamine phosphate or aromatic polyphosphates, nitrogen-containing components, such as ammonium phosphate, intumescent mixtures, carbonates, such as calcium carbonate or magnesium carbonate, or expandable graphite.

Intumescent mixtures expand to afford foams. They are used to provide protection from the effects of heat and fire to combustible materials such as plastics or wood, and also steel, which suffers a loss of strength at elevated temperature.

It is optionally also possible to employ small amounts of antimony trioxide in combination with at least one of the recited flame retardants despite its health hazardous properties.

In an advantageous embodiment the rubber mixture of the layer D also contains at least one acid scavenger which further reduces the toxicity of the resulting smoke gas. The acid scavenger is preferably at least one oxide, wherein calcium oxide and magnesium oxide are particularly suitable alone or in combination.

However, it has proven particularly advantageous when the rubber mixture of layer D also contains at least zinc borate, preferably in amounts of 8 to 20 phr, particularly preferably in amounts of 10 to 15 phr, as a flame retardant. In the event of fire the presence of zinc borate or calcium borate, in each case alone or in combination, brings about a stabilization of the fire crust, thus resulting in a lower MARHE value according to ISO 5660-1. Zinc borate or calcium borate, in each case alone or in combination, likewise reduce smoke gas density in the event of fire.

The rubber mixture of the layer D contains at least one rubber component, which is preferably selected from the group consisting of ethylene-propylene copolymer (EPM) and/or ethylene-propylene-diene copolymer (EPDM) and/or nitrile rubber (NBR) and/or carboxylated nitrile rubber (XNBR) and/or (partially) hydrogenated nitrile rubber (HNBR) and/or fluorine rubber (FKM) and/or chloroprene rubber (CR) and/or natural rubber (NR) and/or epoxidized natural rubber (ENR) and/or isoprene rubber (IR) and/or styrene-butadiene rubber (SBR) and/or carboxylated styrene-butadiene rubber (XSBR) and/or butyl rubber (IIR) and/or bromobutyl rubber (BIIR) and/or chlorobutyl rubber (CIIR) and/or butadiene rubber (BR) and/or chlorinated polyethylene (CM) and/or chlorosulfonated polyethylene (CSM) and/or alkylated chlorosulfonated polyethylene (ACSM) and/or polyepichlorohydrin rubbers (CO; ECO; ETER) and/or ethylene-vinyl acetate rubber (EVA) and/or acrylate rubber (ACM) and/or ethylene-acrylate rubber (AEM) and/or silicone rubber (MQ, VMQ, PVMQ, FVMQ) and/or fluorinated methyl silicone rubber (MFQ) and/or perfluorinated propylene rubber (FFPM) and/or perfluorocarbon rubber (FFKM) and/or polyurethane (PU). The recited rubbers may be employed alone or in a blend.

The rubber component of the rubber mixture of the layer D preferably consists of a rubber or of a rubber blend of at least two rubbers which each provide the mixture with a primarily low flammability and/or have good physical properties for use in dynamically highly stressed articles. These include in particular NR, ENR, IR, CR, CM, CSM, ACSM, BR, NBR, XNBR, HNBR. In a particularly preferred embodiment the rubber component of the rubber mixture of the layer D consists of 100 phr of NR or of a rubber blend of NR and CR.

In a further preferred embodiment it has proven advantageous when the rubber mixture of layer D additionally contains 1,6-bis(N,N-dibenzylthiocarbamoyldithio)hexane. This makes it possible to achieve a good reversion resistance and an improved dynamic capability of the rubber mixture of the layer D while simultaneously allowing the sulfur content in the rubber mixture to be reduced, thus resulting in improved aging stability of the rubber mixture of the layer D.

The main body may either be constructed only of the layer D or else may contain at least one further layer. If further layers are present then the layer D is preferably the outermost outward-facing layer of the article. However, it is also possible for the layer D to be embedded between further layers.

If the layer D is the outermost layer or if the layer D is embedded between further layers, it may be the case in a preferred embodiment that the layer D does not completely envelop the main body but rather is merely partially present, especially in places particularly exposed to fire risk.

Thus for example a further layer A which forms the so-called "inner cap" and which is constructed from an elastomer mixture and has particularly good elastic properties may be present. The elastomer mixture is a vulcanizable, preferably thermoplastic-free, rubber mixture containing at least one rubber component and further mixing ingredients. Contemplated rubber components especially include: ethylene-propylene rubber (EPM), ethylene-propylene-diene rubber (EPDM), nitrile rubber (NBR), carboxylated nitrile rubber (XNBR), (partially) hydrogenated nitrile rubber (HNBR), fluoro rubber (FKM), chloroprene rubber (CR), natural rubber (NR), epoxidized natural rubber (ENR), isoprene rubber (IR), styrene-butadiene rubber (SBR), carboxylated styrene-butadiene rubber (XSBR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The abovementioned rubber types may be unblended. The use of a blend is also possible.

The rubber type preferred depends on the article type and the demands on the individual article. The usual mixture ingredients comprise at least one crosslinker or one crosslinker system (crosslinking agent and accelerator). Additional mixing ingredients are usually at least one filler and/or at least one processing aid and/or at least one plasticizer, for example phosphate ester plasticizers, and/or at least one aging stabilizer and optionally further additives, for example color pigments, reinforcing fibers, etc.

Reference is made in this connection to the general prior art in rubber mixing technology.

The composition of the rubber mixture of layer A may be qualitatively and/or quantitatively identical or different to the rubber mixture of the layer D.

If the rubber mixture of the layer A is qualitatively and quantitatively identical to the rubber mixture of the layer D, i.e. similarly fire-retarded, the fire-promoting gases and substances formed in case of fire can pass through to the outside only with a delay, if at all, and can thus amplify an article fire only to a reduced extent, if at all. In addition, any strength member layers present which may be fast-melting, see layer B, are thus better protected or do not pass through to the outside.

At least one layer B which is formed from at least one strength member may also be present in a particular embodiment. This is preferably a cord weave composed of one or more plies, preferably of two plies, having good adhesion to the layer A. In a very particularly preferred embodiment this is a BiStretch fabric as described for example in WO 2016045813 A1.

Materials used for the layer B may be any known synthetic and natural materials alone or in combination, i.e. in the form of a hybrid fabric. Contemplated synthetic materials especially include synthetic polymers, for example acrylonitrile, polyacrylonitrile, polypropylene, polyester, polyamide, polyurethane, polyphenylene sulfide, polyoxadiazole, aramids, such as p-aramid, m-aramid or copolypara-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polyvinyl alcohol.

The natural materials may be rockwool or asbestos, cotton, flax or hemp, or wool or silk.

Inorganic materials such as glass, ceramic, carbon, metal, for example steel, or stone, for example basalt, are likewise conceivable.

Preference is given to polyamide, especially PA 6,6, or polyester, alone or in combination.

In order to achieve sufficient processing stickiness during the production process for the article, the cord fabric may be rubberized or frictionized on one or both sides. Rubberization may preferably be accomplished either using a composition which is quantitatively and/or qualitatively identical to the composition for the layer C or is quantitatively and/or qualitatively identical to the composition for the layer A. This simplifies the production process for the article and contributes to a dynamically suitable adhesive bond.

In a further preferred embodiment the article may further contain at least one additional layer C. The layer C then forms the so-called "outer cap" of the article. The layer C may be be a one-ply or two-ply layer. The elastomer mixture of the layer C is a vulcanizable, preferably thermoplastic-free, rubber mixture containing at least one rubber component and further mixture ingredients. Contemplated rubber components especially include: ethylene-propylene rubber (EPM), ethylene-propylene-diene rubber (EPDM), nitrile rubber (NBR), carboxylated nitrile rubber (XNBR), (partially) hydrogenated nitrile rubber (HNBR), fluoro rubber (FKM), chloroprene rubber (CR), natural rubber (NR), epoxidized natural rubber (ENR), isoprene rubber (IR), styrene-butadiene rubber (SBR), carboxylated styrene-butadiene rubber (XSBR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The abovementioned rubber types may be unblended. The use of a blend is also possible.

The type of rubber preferred depends on the nature of the article. The usual mixture ingredients comprise at least one crosslinker or one crosslinker system (crosslinking agent and accelerator). Additional mixture ingredients usually further include a filler and/or a processing aid and/or a plasticizer and/or an aging stabilizer and also optionally further additives (for example color pigments, adhesion promoters, flame retardants, reinforcing fibers). Reference is made in this connection to the general prior art in rubber mixture technology.

The article may also contain at least one further layer E based on at least one thermoplastic. Employable thermoplastics include for example polyolefin, especially polyethylene (PE), such as LD-PE, LLD-PE, UHMW-PE, or polypropylene (PP), polystyrene (PS), polyamide (PA), for example PA 6 or PA 6,6, polyesters, for example PET, PEN or PBT. In a particularly preferred embodiment the layer E is in the form of a film. The use of PE film has been found to be particularly suitable since it forms a particularly good adhesive bond especially in the case of peroxidically crosslinking elastomer mixtures, thus making it possible in some cases to dispense with further adhesion promoters. The layer E has a particularly good adhesion-enhancing effect depending on the nature of the article and the nature of the further layers. It can be applied to the article blank with the aid of a radiant heater and pressure.

The article is preferably an air spring bellows, a metal-rubber element, a vibration damper or a damping element of a bearing, of a bushing or of a multilayered spring or conical spring. The article may alternatively be a tubular body. Tubular bodies are, for example, feed hoses of any kind, air spring bellows (cross-ply bellows, axial bellows) and compensators in various embodiments (e.g., torsion compensator, lateral compensator). The article may likewise be a drive belt. The article is preferably an air spring bellows, a metal-rubber element, a vibration damper or a bearing, for example box bearing or a conical bearing, more particularly a moulded article for rubber-sprung rail vehicle wheels.

The invention claimed is:

1. A rubber mixture comprising at least one carbon black having a BET surface area according to DIN-ISO 9277 between 35 and 140 m²/g and an oil absorption number (OAN) according to ISO 4656 between 70 and 140 ml/100g, a first aluminum trihydrate (ATH_1) and at least a further aluminum trihydrate (ATH_2), wherein the first aluminum trihydrate (ATH_1) and the further aluminum trihydrate (ATH_2) each have a different particle size;

wherein the particle size $d_{50}$ of the first aluminum trihydrate (ATH_1) determined by laser diffraction is between 0.1 and 0.6 μm and the further aluminum trihydrate (ATH_2) has a particle size $d_{50}$ determined by laser diffraction of between 0.9 and 1.5 μm;

wherein the rubber mixture comprises 100 phr of CR or 100 phr of a blend of CR and NR (CR/NR) as the rubber component;

wherein the amount of carbon black is 5 to 30 phr;

wherein the first aluminum trihydrate (ATH_1) is incorporated in an amount of from 35 to 60 phr;

wherein the at least one further aluminum trihydrate (ATH_2) is incorporated in an amount of from 80 to 120 phr;

wherein the first aluminum trihydrate (ATH_1) and the at least one further aluminum trihydrate (ATH_2) are silanized;

wherein the rubber mixture further comprises zinc borate incorporated in an amount of from 10 to 15 phr;

wherein the rubber mixture further comprises 1,6-bis(N, N-dibenzylthiocarbamoyldithio)hexane:

wherein the rubber mixture is free of halogen-containing flame retardants; and wherein the rubber mixture satisfies the Hazard Level 2 fire safety require safety standard EN45545.

2. The rubber mixture according to claim 1, wherein the at least one carbon black is selected from N550 and N339 carbon blacks.

3. The rubber mixture according to claim 1 further comprising an acid scavenger selected from calcium oxide, magnesium oxide or both.

4. The rubber mixture according to claim 1 further comprising calcium borate.

5. The rubber mixture according to claim 1 comprised in an air spring bellows.

6. The rubber mixture according to claim 1 comprised in a metal-rubber element, a vibration damper, a damping element of a bearing of a bushing, a damping element of a multilayered spring, a damping element of a conical spring, a tubular body or a drive belt.

7. The rubber mixture according to claim 5 in which the rubber mixture forms an outermost layer (D) of the air spring bellows, the air spring bellows further comprising an inner cap layer (A) formed from an elastomer mixture, and a layer (B) formed from at least one strength member.

8. The rubber mixture according to claim 7, wherein the elastomer mixture of the inner cap layer (A) is the same as the rubber mixture that forms the outermost layer (D).

9. The rubber mixture according to claim 7, wherein the elastomer mixture of the inner cap layer (A) is different from the rubber mixture that forms the outermost layer (D).

10. The rubber mixture according to claim 7, wherein the at least one strength member of the layer (B) is arranged as a cord weave.

11. The rubber mixture according to claim 10, wherein the layer (B) is adhered to the inner cap layer (A).

12. An article comprising:

a rubber mixture forming at least one layer of the article, the rubber mixture comprising at least one carbon black having a BET surface area according to DIN-ISO 9277 between 35 and 140 m$^2$/g and an oil absorption number (OAN) according to ISO 4656 between 70 and 140 ml/100g, a first aluminum trihydrate (ATH_1) and at least a further aluminum trihydrate (ATH_2), wherein the first aluminum trihydrate (ATH_1) and the further aluminum trihydrate (ATH_2) each have a different particle size;

wherein the particle size $d_{50}$ of the first aluminum trihydrate (ATH_1) determined by laser diffraction is between 0.1 and 0.6 μm and the further aluminum trihydrate (ATH_2) has a particle size $d_{50}$ determined by laser diffraction of between 0.9 and 1.5 μm;

wherein the rubber mixture comprises 100 phr of CR or 100 phr of a blend of CR and NR (CR/NR) as the rubber component;

wherein the amount of carbon black is 5 to 30 phr;

wherein the first aluminum trihydrate (ATH_1) is incorporated in an amount of from 35 to 60 phr;

wherein the at least one further aluminum trihydrate (ATH_2) is incorporated in an amount of from 80 to 120 phr;

wherein the first aluminum trihydrate (ATH_1) and the at least one further aluminum trihydrate (ATH_2) are silanized;

wherein the rubber mixture further comprises zinc borate incorporated in an amount of from 10 to 15 phr;

wherein the rubber mixture further comprises 1,6-bis(N, N-dibenzylthiocarbamoyldithio)hexane;

wherein the rubber mixture is free of halogen-containing flame retardants; and wherein the rubber mixture satisfies the Hazard Level 2 fire safety requirements according to fire safety standard EN45545;

wherein the article is an air spring bellows, a metal-rubber element, a vibration damper, a damping element of a bearing of a bushing, a damping element of a multi-layered spring, a damping element of a conical spring, a tubular body, or a drive belt.

13. The article according to claim 12, wherein the article comprises multiple layers in which the rubber mixture forms at least one of the multiple layers.

14. The article according to claim 13, wherein the at least one layer formed by the rubber mixture is an outermost layer (D).

15. The article according to claim 14, wherein the article further comprises an inner cap layer (A) formed from an elastomer mixture, in which the rubber mixture of the inner cap layer (A) is the same as or is different from the rubber mixture that forms the outermost layer (D).

16. The article according to claim 15, wherein the article further comprises a layer (B) formed from at least one strength member.

17. The article according to claim 16, wherein the at least one strength member is arranged as a cord weave.

18. The article according to claim 17, in which the article is an air spring bellows.

* * * * *